June 8, 1965  E. F. HARRETT  3,187,493
HARVESTER

Filed Nov. 30, 1962  6 Sheets-Sheet 3

INVENTOR.
ERNEST F. HARRETT
BY
ATTORNEYS

June 8, 1965  E. F. HARRETT  3,187,493
HARVESTER

Filed Nov. 30, 1962  6 Sheets-Sheet 4

INVENTOR.
ERNEST F. HARRETT
BY
ATTORNEYS

June 8, 1965 E. F. HARRETT 3,187,493
HARVESTER

Filed Nov. 30, 1962 6 Sheets-Sheet 6

INVENTOR.
ERNEST F. HARRETT

BY

ATTORNEYS

United States Patent Office 3,187,493
Patented June 8, 1965

3,187,493
HARVESTER
Ernest F. Harrett, Kewadin, Mich.
Filed Nov. 30, 1962, Ser. No. 241,267
14 Claims. (Cl. 56—330)

This invention relates to berry harvesting equipment, and more particularly to a self-propelled blueberry harvesting vehicle.

Although some fruit crops can presently be harvested automatically by shaking the fruit from the trees, presently known and available apparatuses are limited to tree crops such as cherries. Berry products, especially blueberries, must still be picked by hand. Associated with hand picking are many difficulties for the blueberry farm owner or operator. Often, pickers are not available. The shortage of competent pickers becomes greater each year as blueberry plantations become larger and more numerous. Hand picking is also slow. Large numbers of lightweight carrying containers must also be provided each year for each picker. Further, many labor problems usually arise during the season. Still other difficulties exist as is well-known to blueberry farm owners. Consequently, there is a great need for automatic blueberry picking equipment. Several types of devices have been tried heretofore with little success. Blueberries grow on bushes that are usually in closely spaced rows with the bushes in each row being very close. Conventional shakers mounted on a tractor and which grip a tree trunk are not capable of harvesting blueberries from the relatively delicate, flexible bushes. Firstly, the rows are too close for tractor maneuvering. Moreover, conventional "arm and hand" type shaker elements cannot properly grip a large part of the bush which is composed of a number of delicate stems and branches. Further, the falling berries could not be caught with presently known equipment. Also, all parts of a flexible bush do not shake properly when the bush base of several stems is shaken, like the branches of a tree do when the trunk is shaken.

It is therefore an object of this invention to provide a self-propelled berry harvester, especially for blueberries, that can move down a row of close blueberry bushes in a straddling fashion so that it can be readily maneuvered through the rows without damage to the bushes.

It is another object of this invention to provide a blueberry harvesting apparatus having unique bush gripping and shaking means and berry catching means between the legs of the straddling self-propelled vehicle. The apparatus shakes off all ripe berries from a blueberry bush at one time, being able to remove the berries in less than a minute where a large fraction of an hour or more is ordinarily required with two pickers on a bush. The apparatus can efficiently remove the berries in spite of the multiple stem bush system, and in spite of the flexible nature of the bush branches, yet without damage to the delicate branches and stems. The berries are caught beneath the bush by a special apron means without significant berry loss, in spite of the fact that the group of spaced stems is several inches in diameter.

It is still another object of this invention to provide a blueberry harvesting apparatus that has a variable gap and variable pressure gripping means, and that has a variable intensity vibration to be able to suit the particular size and characteristics of the bush.

It is another object of this invention to provide a berry harvester having unique removal means for a flexible bush structure, including vibrating means cooperating with vibrational interference means to disrupt the vibrational pattern of the flexible branches wherein the bunches of berries tend to form the nodal portions of the pattern. Disruption of the pattern allows berry vibration and causes them to fall.

These and several other objects regarding the specific forms of the apparatus will be obvious upon studying the following specification in conjunction with the drawings in which:

Basically, the inventive berry harvesting machine comprises a bush-straddling self-propelled frame generally shaped like an inverted U, including gripping means extensible and retractable toward and away from each other from the opposite legs of the vehicle to accommodate the width of the bush base and to press against the base with a selected pressure, oscillating, vibrating or shaking means to oscillate the gripping means on the opposite sides in a synchronous manner and with variable intensity, flexible, berry collecting, apron means extensible from the opposite legs and sufficiently flexible to wrap around the base of the bush. Unique vibrational interference means is mounted on opposite sides, i.e. adjacent the opposite legs, to contact the branch tips and berries and disrupt the nodal vibrational patterns, to thereby cause the berries to be vigorously shaken from the bush.

In one form of the invention, the gripping means is mounted on depending columns affixed to overhead support plates slidable toward and away from each other across the cross member of the inverted U frame as controlled by a fluid cylinder. Crank and pitman arrangements on opposite sides are synchronized to oscillate the gripping means from side to side. In another form of the invention, a pair of fluid cylinders on each side support a bracket in an extensible manner, with a second pair of fluid cylinders being affixed to the bracket and supporting the gripping means so that extension of the first fluid cylinders places the gripping means against the base of the plant, while oscillation of the second fluid cylinders, acting as slaves in response to a master cylinder, vibrates the bush. Other inventive features in combination with these are also included as will be apparent from the detailed specification to follow.

Figure 5:
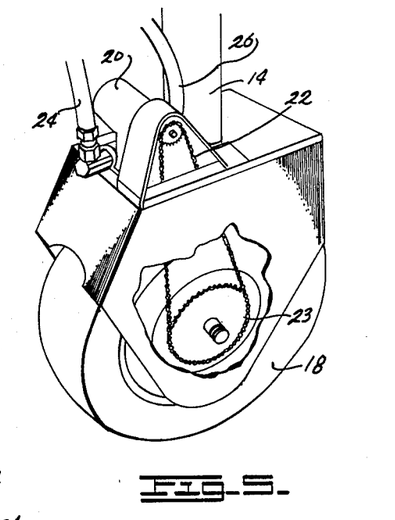
FIG. 5 is a perspective view of the drive mechanism on one rear wheel.

Referring specifically to the drawings, the inventive berry harvesting vehicle comprises a frame of structural steel elements which form an upper rectangular platform having wheeled support posts depending from each corner. The frame is shaped generally like an inverted U from the front to back, with the inverted legs of the U forming the sides of the machine and the base of the U forming the top platform. It thus is able to straddle a row of berry bushes. Fixedly mounted on top of the machine is an internal combustion engine 16 which, as will be explained in detail hereinafter, both propels the machine and operates all of the movable components thereof, preferably through fluid motors and fluid cylinders. On the lower ends of the four telescopically adjustable support columns 14 are four wheels. The rear wheels 18 serve to drive the mechanism through fluid motors 20 and chain and sprocket mechanism 22 to sprocket 23 on the hub of each rear wheel 18. Each fluid motor 20 is driven by pressurized fluid flowing in through circuit conduit hose 24 and out through hose 26 (FIG. 5).

In the form of the invention shown, the front wheels 40 are mounted in brackets 42, which are pivotally mounted by thrust bearings (not shown) to elements 44 inside the outer shells of columns 14. The wheels are each connected to a central sleeve (not shown) inside tubular elements 44 and which extend up to the top and have sprockets 46 affixed to the upper ends. (See especially FIG. 3.) A transversely extending chain 48 passes around both sprockets and includes a section 50 of gear rack affixed therein. This rack is cooperative with a spur gear 52 affixed to steering shaft 54 which is mounted rotatably in bearings 56 at the front and 58 at the rear of the apparatus. A second sprocket and chain 60 is affixed to shaft 54 at the rear and extends down to steering column 62 to which steering wheel 64 is attached. Rotation of the steering wheel thus operates pinion 52, rack 50, chain 48 and sprockets 46 to pivot the inner elements and turn the wheels 40.

It may be desirable to locate the steering wheel 64 and a suitable seat (not shown) on top of the entire vehicle if desired, rather than at the rear thereof as shown. Also, it may be desirable to provide an automatic steering mechanism with a pair of spaced sensors that extend out in front of the vehicle and contact the opposite sides of the bushes to operate a servo valve mechanism that controls the steering operation of the front wheels 40 to steer the device down a row. Other modifications may also be made in this steering mechanism as is desired.

Figure 8:
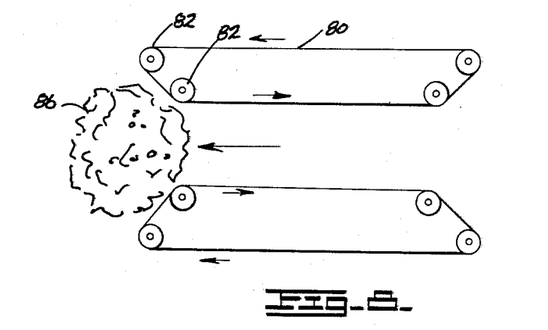
FIG. 8 is a diagrammatic plan view of one form of guide for the bushes between the legs of the harvesting apparatus.

As the vehicle is driven over a row by power applied to rear wheels 18 (FIG. 5), bushes are guided into the front end of the machine and by funneling guide elements 70 and 72 (FIGS. 1 and 3) which may be formed of sheet metal. The guide means includes a pair of diagonally positioned wheels 92 and 94 to help roll the bushes between the legs of the mechanism without skinning the bark from the stems and branches. Alternatively, in order to eliminate all possibility of the guide means scrubbing bark off the delicate stems and branches of the bushes, it may be desired to use a plurality of funneling V-belts which move rearwardly along the surfaces 70 and 72 at the same rate which the vehicle moves forwardly across the ground. A schematic plan view of such a V-belt assembly is illustrated in FIG. 8. The V-belts 80 pass around sheaves or pulleys 82 as each belt is controllably driven, for example, as by the respective fluid motor 20 driving the adjacent wheel, using a suitable drive connection, so that, as the vehicle moves ahead in the direction of the central arrow at a certain velocity (e.g. 2 m.p.h.) with respect to the ground, the belts will move in the opposite direction adjacent the bushes, at this same velocity with respect to the vehicle. Consequently, when a portion of the belt contacts a bush 86, that same section of belt remains in contact with this same section of the bush as the vehicle passes thereover. This completely eliminates any rubbing action on the bush. The pulleys may actually be arranged to accommodate two or more different V-belts 80 and 80′ on each side, spaced above and beneath each other (FIG. 10) on two sheaves 82 and 82′ connected by shaft 88. To enable the apparatus to accommodate bushes of any height, the telescoping corner support columns 14 can be vertically adjusted. Also, in order to enable the vehicles to accommodate uneven terrain having pockets and rough spots, the front wheels are vertically movable on an equalizing rocker arm assembly including a horizontal, transverse rocker arm 100 pivoted to frame 12 at 102, and operably connected to the front columns through posts 104. The front wheels thereby have limited vertical movement as the vehicle moves across uneven terrain to prevent one wheel from being suspended in the air.

Extending from the opposite legs of the frame, and adapted to be positioned on opposite sides of a bush over which the vehicle has stopped, is a pair of gripping bars 110 and 112, including resilient inner surfaces of rubber or the like, facing each other from the opposite sides.

In the first form of the invention (FIG. 6), these gripper elements are fixedly mounted to a pair of stub shafts 114 and 116 which in turn are pivotally mounted to a pair of pitmans or connecting rods 118 and 120. The connecting rods on each side have their outer ends pivotally affixed to a pair of cranks 122 and 124 connected by shaft 126. One of the cranks 124 is affixed to a sprocket 128 driven by a chain 130 extending downwardly from the top of the apparatus where the chain is engaged with a second drive sprocket 132. This drive sprocket is mounted on shaft 133 driven by bevel gear 134 meshing with bevel gear 136 attached to shaft 138. Shaft 138 is driven by fluid motor 142 through a suitable sprocket and chain connection 140. Shaft 138 is telescopically adjustable across the platform. It includes an outer sheath portion 138′ (FIG. 3) on the drive end and a rectangular portion 138″ interfitting with a rectangular interior in portion 138′ to provide a rotatable drive connection. Thus, as sprocket drive 140 rotates shaft 138, it drives bevel gear 136 at one end of the shaft, and bevel gear 136′ at the other end of the shaft. From gear 136′ is an oscillating drive connection to the opposite gripper or bumper element 112 through a second set of sprockets, chains, cranks and pitmans. The crank and connecting rod arrangement on one side is oriented in an opposite manner to that of the other so that with simultaneous driving thereof, one bumper bar will be retracted while the other is extended and vice versa, so that they move in synchronism together from one side to the other. This is necessary in order to keep them in gripping relationship with the bush during oscillation. If this were not done, the bars would repeatedly pound the bush and severely damage it.

Figure 1:
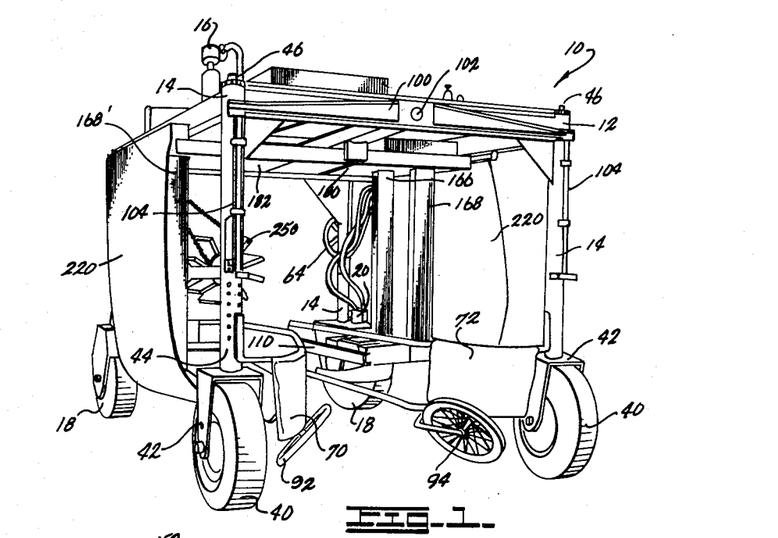
FIG. 1 is a perspective view of the front of the harvesting vehicle, and more specifically of one form of the invention.
Figure 2:
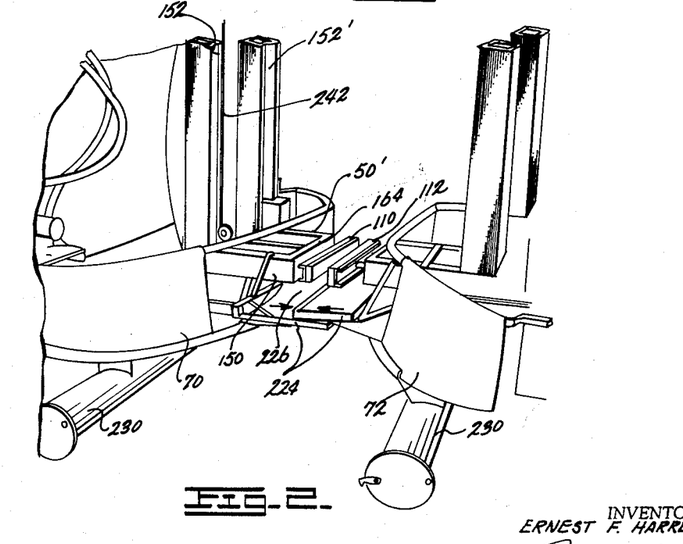
FIG. 2 is a fragmentary, perspective view of the central portion of the machine in FIG. 1 taken from the rear thereof.
Figure 3:
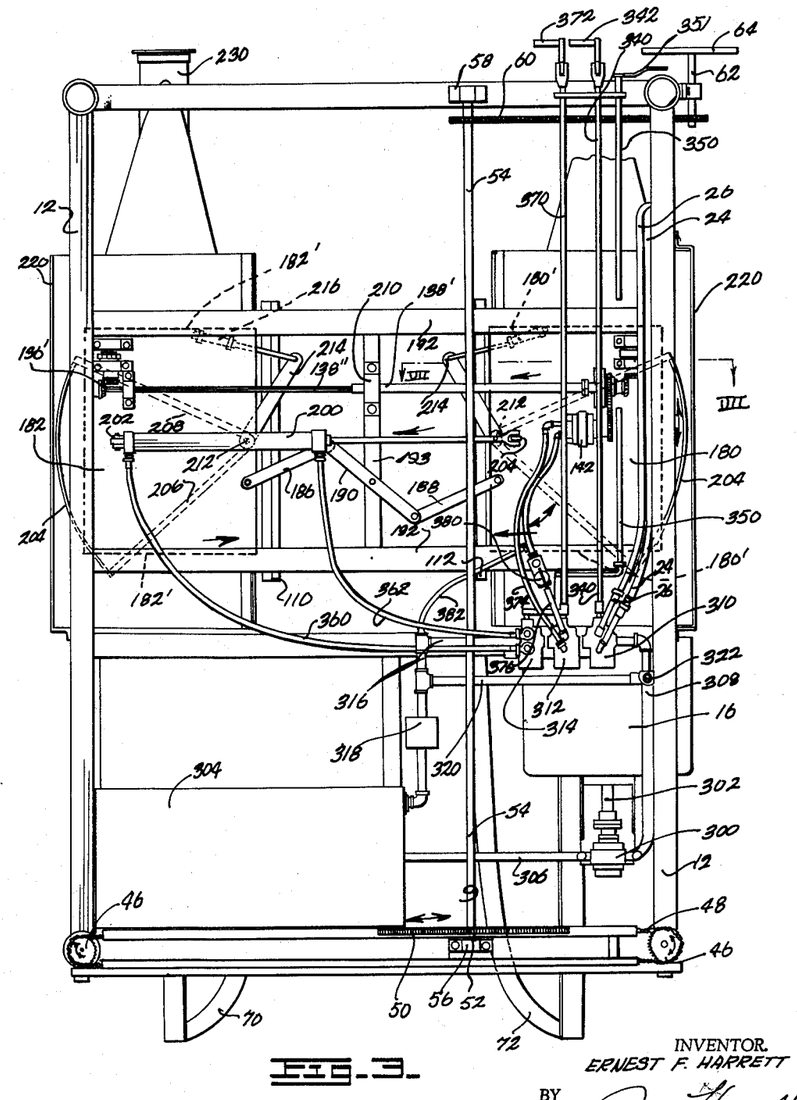
FIG. 3 is a top plan view of the apparatus in FIGS. 1 and 2.
Figure 4:
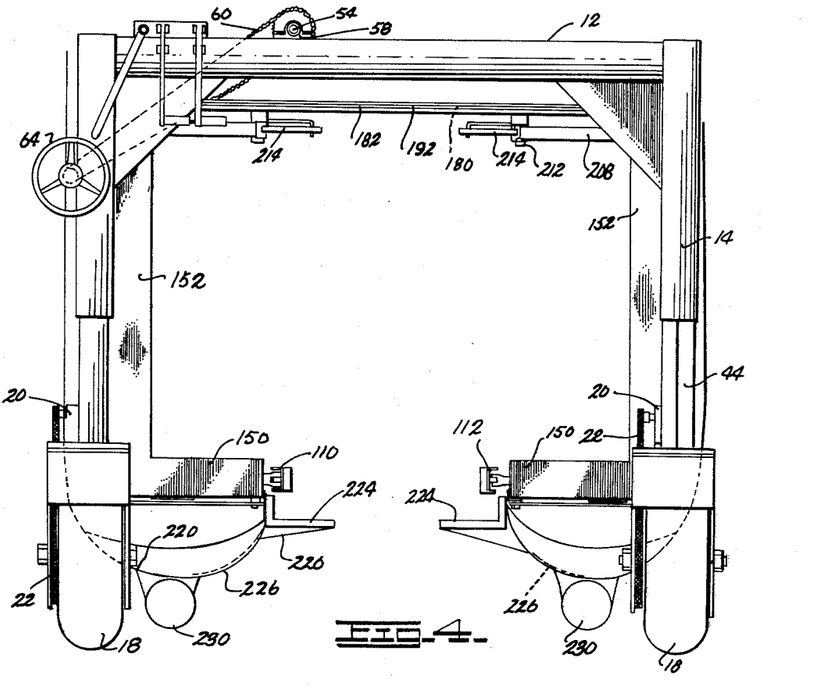
FIG. 4 is a rear elevational view of the novel harvesting apparatus.
Figure 6:
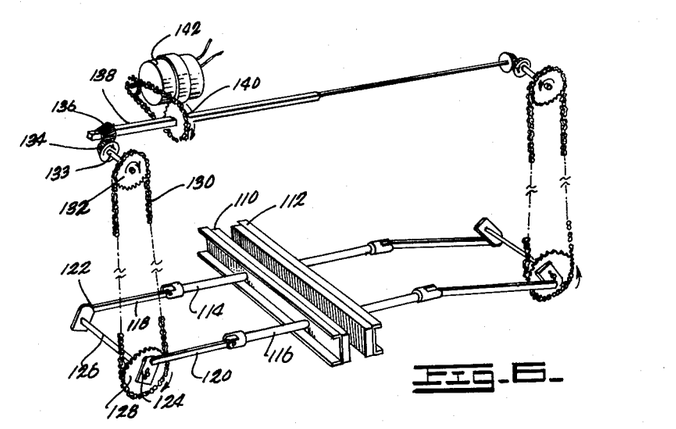
FIG. 6 is a perspective view of the vibrating mechanism for the bush gripping means.

Before the grippers can vibrate a plant, they must be moved from a contracted state away from each other and adjacent the legs of the frame as in FIG. 4, to an extended position toward each other and away from the legs of the frame as in FIGS. 2 and 6. The crank and pitman connections are operably mounted in the horizontal, lower legs 150 of the four L-shaped members which also include the upright elongated legs 152. These L-shaped members face each other across the space between the legs of the frame 12 (FIG. 4). Each base portion 150 of each L-shaped member is spaced in a parallel manner from the adjacent L-shaped member base 150′ (FIG. 2). These are connected by a cross beam 164 at the inner ends. This cross beam supports the outer ends of elements 114 and 116 (FIG. 6) during their reciprocal movement. These pairs of upright column elements 152 and 152′ on the opposite sides are hollow to house the chains 130 (FIG. 6) for the vibrating drive sequence, as well as the sprocket 128 and crank 124. The horizontal legs 150 and 150′ house the pitmans 118 and 120 and rods 114 and 116. Since the entire gripping and oscillating assembly is operably mounted to the L-shaped elements, it will be obvious that, in order to place the gripping elements 110 and 112 in gripping relationship with the stems of the bush before shaking begins, i.e. to extend them toward each other, column portions 152 and 152′ supporting this structure must be moved towards the like column portions on the opposite side of the structure. The upper ends of the two pairs of columns 152 and 152', are rigidly affixed as by weldment to a pair of slidable support plates 180 and 182 formed of thick steel or the like (FIGS. 1 and 3). Each of these plates 180 and 182 is generally rectangular in configuration and is horizontally positioned. The two are opposite to each other. They are interconnected by a linkage composed of three links, link 186 having its outer end pivotally affixed to plate 182, and its inner end pivotally affixed to the central link 190, link 190 pivoted at its center to rigid cross beam 193, and at its opposite end to link 188, and link 188 which has its outer end pivotally affixed to plate 180. The side edges 182" of bearing plate 182, and edges 180' of plate 180 are interfitted slidably in a pair of transverse guides 192 which are generally U-shaped in cross section so that the slots of the U face each other to slidably receive the plates 180 and 182. Plates 180 and 182 may be moved toward or away from each other by a fluid cylinder 200 having its outer cylinder end 202 affixed to plate 182 and its outer rod end 204 affixed to plate 180. Thus, by contraction of the fluid cylinder 200, plates 180 and 182 are drawn toward each other to pull the entire mechanism including the columns, vibrating mechanism and gripper elements toward each other against the base of a plant. Both plates are moved uniformly because of the regulating linkage 186, 190, 188. It will now be obvious why the vibrating, transversely positioned drive rod portions 138'-138" must be telescopically adjustable, since fluid drive motor 142, shaft portion 138' and bevel gears 134 and 136 are operably affixed to plate 180, while the corresponding elements of bevel gear 136' with its cooperating sprockets, etc. are mounted in bearings directly affixed to plate 182 as is seen in FIG. 3. Thus, movement of the plates 180 and 182 towards each other to move the entire columns and gripping element assembly toward each other must be accompanied by movement of the relative sprocket gears and other drive elements by telescopic interrelationship between shaft portion 138' and inner-shaft portion 138". A suitable bearing 210 is mounted to cross brace 193 between tracks 192 for outer shaft portion 138'.

If desired, a pair of arcuate, vertically-extending, curtain-forming elements 204 may each be mounted on radial arms 206 and 208. The arms are in turn pivotally mounted to plates 182 and 180 at 212. A biasing actuator arm 214 including a spring 216 having one end affixed to the track 192, so that as the plates 180 and 182 move toward each other, the two actuator arms 214 will be restrained, causing arcuate movement of radial arms 206 and 208 about pivotal point 212 to thus close the two curtain portions 204 arcuately (see arrows in FIG. 3) toward each other in front of the bush between the gripping elements 110 and 112. The purpose of these curtains is to prevent interference of the next bush in the row by the shaking bush and flying berries. It has been found in actual use, however, that these curtain elements are not always needed.

By actuation of fluid cylinder 200 in varying amounts, the gripper means can be drawn toward each other. Once the bush stems are gripped with the desired degree of intensity, the shaker mechanism operated by fluid motor 142 is actuated to shake the bushes.

Figure 7:
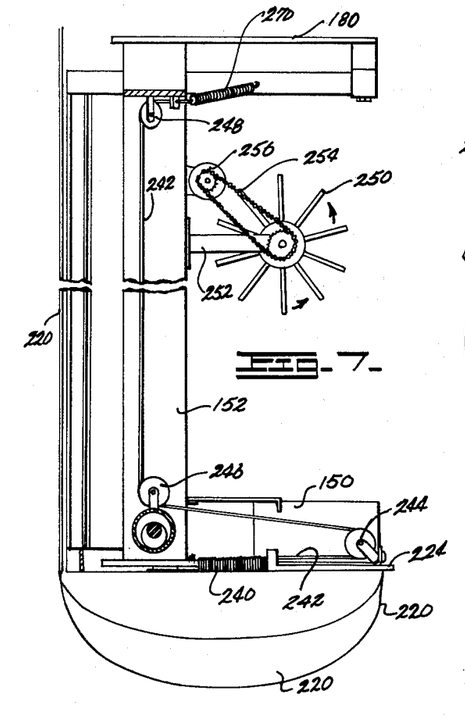
FIG. 7 is a sectional view of one-half of the mechanism taken on the plane VII—VII of FIG. 3.

Merely shaking the bush is not usually sufficient to effectively remove most of the blueberries. It has been found that, as the base of the bush is shaken, the bush tends to set up a fixed vibratory pattern along the branches. The bunches of berries usually have the most resistance to rapid vibration, due to their inertial effect caused by their weight, coupled with the flexible nature of the branches. Consequently, it has been found that the blueberry bunches form nodes in a vibratory pattern and do not shake off readily. However, it has also been found that by merely touching the berries or by touching the branches adjacent the groups of berries to breakup or disrupt this fixed vibratory pattern so that the berries no longer form nodes, the berries will readily fall off the bush. This can even be done with a stick. However, it is preferable to do it automatically. Thus, referring to FIGS. 1 and 7, a paddle wheel structure 250 is there shown mounted on bearings positioned in a pair of braces 252 extending from the upright legs 152 and 152' of the L-shaped support members. There are two paddle wheels, one mounted to the inside surface of each leg of the apparatus. Only one is shown in FIGS. 1 and 7 since the opposite paddle wheel will look and operate exactly the same. It is thought that its inclusion in the drawings would merely overcomplicate them, and its disclosure is adequate without it. The two paddle wheels are mounted on the opposite columns to contact both sides of the bush. The paddle wheel may be made to revolve slowly with a chain drive 254 operated by a suitable fluid motor 256 mounted to the columns to the top of the structure, as desired. These paddle wheels should not revolve rapidly, but slowly to touch the berries and brush the branches upwardly as they are shaken. They do not beat the bushes since this would harm the berries, but are merely interruptors or disruptors of the fixed vibratory pattern which forms with the berries at the nodes. It will be obvious that other equivalent interruptor structures may be used as long as the berries and branches are contacted slightly, to achieve this purpose.

Figures 12, 13:
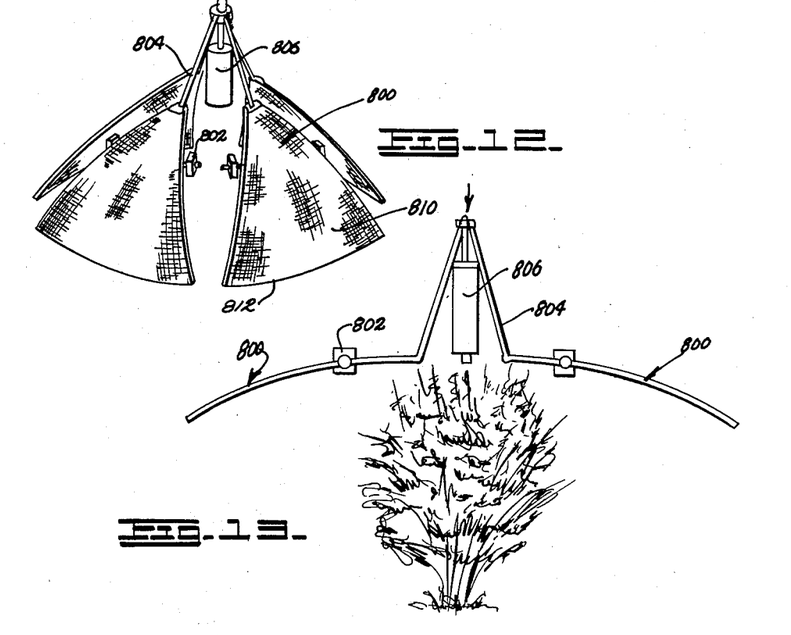
FIG. 12 is a perspective view of a second form of vibration interruptor.
FIG. 13 is a sectional view of the interruptor in FIG. 12 in its raised position.

A second form of interruptor apparatus is illustrated in FIGS. 12 and 13. The apparatus is composed of a plurality of arcuate, spherical shell sections 800 resembling orange peels. Each section is pivotally mounted near the upper end thereof to suitable fixed supports 802 on the frame. All are pivotally mounted to a common rod 804 at their inner upper ends. A fluid cylinder 806 is fixed to the vehicle frame and has its piston rod attached to rods 804 to depress or raise the inner shell ends and thereby pivot the lower outer ends of the sections upwardly or downwardly respectively.

Each section is preferably formed of a wire or other mesh 810 strung between rigid peripheral frame 812.

During passage of the vehicle from bush to bush, the screen shells are held expanded as in FIG. 13. When the bush is being shaken, the screens are lowered into contact with the berries and branches in the position shown in FIG. 12 to interrupt the vibrational pattern and cause the berries to be shaken off into the aprons.

When the gripping elements are moved toward each other to grip the bush, and then are vibrated through the mechanism in FIG. 6 to vibrate the bush simultaneously with disruption of the vibratory pattern, the berries fall off the bush and must be collected. The sides of the apparatus are enclosed largely by suspended, thin, sheet metal or equivalent curtain walls 220 mounted at their upper ends to the outer edges of the cross member of the U-shaped frame and mounted at their opposite lower ends to the inside of the cross members 164 of the L-shaped supports. This is best illustrated in FIG. 7. This presents a basically J-shaped retainer which not only prevents berries from flying out the side of the apparatus, but also helps collect the berries in the trough formed by the bottom of the J. Of course, since the J's face each other, one will always appear backwards, just as one of the face L supports appears backwards. Since these sheet metal elements are fixed and do not extend across the gap where the bush enters between the legs, an extensible form of berry collector must be provided to supplement this trough element. This is achieved with a pair of horizontal generally rectangular aprons 224 formed of steel frames (FIGS. 2, 4 and 7) each having a canvas, i.e. flexible cloth or similar material suspended therebetween. These cloths are flexible at their inner edges and the frame is somewhat flexible so that as the pair of aprons 224, 226 are extended toward each other, the flexible canvas cloth will literally wrap around the base of the bush to neatly enclose the entire area around the stems of the bush and catch the falling berries. The outer tail ends of these canvas cloths extend down into the trough formed by the sheet elements 220 (FIG. 4) so that when the aprons are extended, the berries roll down the cloths and into the troughs. They roll to the rear of the slanted troughs and can be collected and removed through suitable outlets 230. The outer edges of frames 224 for the aprons are slidably mounted in tracks along the bottom of legs 150 of the L-shaped support elements and are normally held in a retracted position by tension springs 240 (FIG. 7). In this form of the invention, the aprons are automatically extended with the grippers. Each apron has affixed to its center a cable 242 which extends around a fixed sheave 244 rotatably secured to the outer end of the lower horizontal frame portion 150 (FIGS. 2 and 7) then extends back around sheave 246, upwardly between columns 152 and 152', around a third sheave 248, and is connected to a fixed part of the frame element by a tension spring 270. Thus, when the two column portions are brought together by movement of plates 180 and 182, since the spring 270 is attached to arm 206, cable 242 will be tightened and drawn upwardly to pull the aprons 226 toward each other at a rate and a distance twice that of the legs 150 and bumpers 110 and 112, due to the passage of cable 242 around sheave 244. Thus, by the time the bumper elements 110 and 112 are adjacent the base of the plant several inches apart, the apron elements will be overlapping each other as in FIG. 2 with the front edges of the canvas stretched around the base of the bush tightly to essentially close up this area and catch the berries.

Power for the driving operation and for the hydraulic control of all of the moving components thereof is obtained from an internal combustion engine 16 (FIGS. 1 and 3). This engine operates pump 300 by shaft 302 to pump oil from reservoir 304 through lines 306, 308 to the forward-reverse control valve 310, the oscillating or shaking drive control valve 312 (to fluid motor 142) and to control valve 314 for moving the bumper elements 110 and 112 toward and away from each other (through fluid cylinder 200). The oil returns to reservoir 304 through line 316 and filter 318. A by-pass line 320 with a pressure relief by-pass valve 322 is provided to relieve excess pressure as necessary.

Shifting of valve 310 by control rod 340 using hand lever 342 enables the driver to stop and start the vehicle by controlling the fluid pressure from pump 300 to valve 310, through lines 24 and 26 to wheel drive fluid motors 20 (FIGS. 5, 4 and 1). Control of valve 314 is had through rod 350 and lever 351 with associated linkage to allow fluid flow in one direction or the other through hoses 360 and 362 to fluid cylinder 200, to open or close the space between the bumpers 110 and 112 and to move the aprons. Control of valve 312 through rod 370 controlled by hand lever 372 regulates fluid to motor 142 through lines 374 and 376 to oscillate the bumpers through the pitman-crank connections or to stop their oscillation. The intensity of oscillation is controlled by a variable flow-dividing valve 380 in line 376 to control the rate of fluid flow to motor 142, and thus control the intensity of oscillation of the bumpers and thus of the vibration or shaking effect. Adjacent regulator valve 380 is a by-pass hose 382 which returns fluid back to line 316 to reservoir 304 in varying amounts. This valve 380 and its associated lines act as a speed regulator for the oscillation mechanism.

Operation

To harvest blueberries, the operator sits on a suitable seat (not shown) adjacent steering wheel 64, whether mounted behind the vehicle or on top of it. Assuming that internal combustion engine 16 is operating to operate pump 300 and thus pump pressurized fluid from reservoir 304, the operator first shifts lever 342 and rod 340 to shift control valve 310 to the wheel drive mechanism. Thus, fluid flows to motors 20 on the rear wheels 18 to drive the chain sprocket means (FIG. 5) and cause the vehicle to move. Similar hoses go to both rear wheels 18. He steers the vehicle using the steering wheel 64 to the sprocket drive and steering shaft 54 to rotate pinion 52, shift gear rack 50, shift chain 48 and rotate sprockets 46 to turn the front wheels so that the vehicle can be steered to cause the two side legs of the inverted U-shaped frame to move over the top of a bush in a row of blueberry bushes. As the vehicle begins to go over a bush, the wheels 92 and 94 force the outwardly projecting branches to be moved up so that they will not be scrubbed harmfully. If a V-belt guide mechanism is used as in FIGS. 8 and 9, the motors 20 operate the V-belts also so that the bushes when contacting the belt will not be scrubbed by moving surfaces, but rather the belt portion contacting it will stay in the same position on the bush as the vehicle moves by. As soon as the bush is between the bumper or shaker elements 110 and 112, control valve 310 is again shifted to stop the vehicle. A suitable hydraulic lock or mechanical brake may be utilized to hold the vehicle in this position. Next, gripper elements 110 and 112 are moved toward each other, and away from the side legs of the frame 12 to grip the base of the bush, and more specifically, the plurality of stems thereof with the desired pressure. Thus, the operator shifts lever 351 and shaft 350 to open valve 314 and allow fluid flow to cylinder 200 to contact the piston and shaft so that plates 180 and 182 are moved toward each other as regulated by linkage 186, 188, 190. With movement of these plates, the L-shaped frame members 150, 152 shift towards the center into the space between the legs of the vehicle until the rubber faces of bumpers 110 and 112 abut the bush with the desired pressure. Then the valve is closed to retain these elements in this gripping position. Simultaneously, with inward movement of the bumpers, aprons 224 and their respective canvas members 226 also move in at twice the rate of the bumpers and twice the distance to slightly overlap, and surround the base of the bush due to the wrapping of the flexible canvas therearound. If arcuate curtains 204 are employed, these also close in front of the bush as the plates 180 and 182 shift.

Next, the operator shifts lever 372 and shaft 370 to open the control valve 312 to the fluid motor 142 to cause the drive sequence illustrated in FIG. 6 to begin operation. With rotation of shaft 138 and thus of the bevel gears 136 and 136' the two sprocket drives to the respective crank and pitmans to these shakers are started into operation. The two shakers move simultaneously to one side and the other in a synchronous manner to shake the bush while remaining in contact with it. The intensity of shaking is controlled by adjustment of flow divider valve 380. Simultaneously, the fluid motors 256 (FIG. 7) are actuated to drive the paddle wheels 250, arcuate screen shells 800, or other vibration interrupting means to contact the berry bunches and the bush branches to break up the vibratory patterns which occur with the berry bunches at the nodes. This causes the vigorously shaken berries to fall on canvasses 226 and roll back into the trough, or fall directly into the troughs formed by sheet metal 220 and back to the outlets 230 where they may be emptied as desired. When the brush has been shaken clean, the operator then stops the shaking operation by shifting control valve 312 again. He then opens the gripping mechanism and apron by reversing valve 314 to extend the fluid cylinder 200. He also stops operation of fluid motors 256 to the vibration mechanism. He then moves on to the next bush.

Modification

Figures 9, 10:
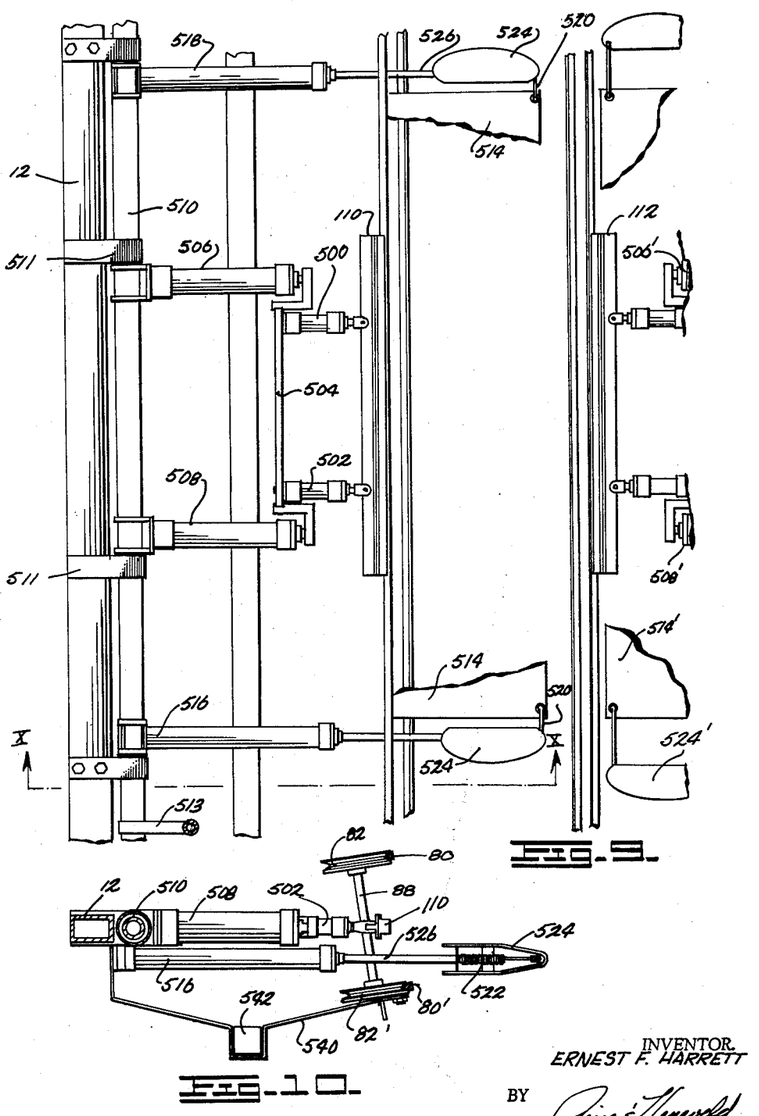
FIG. 9 is a top plan, fragmentary view of a second form of the inventive apparatus.
FIG. 10 is an elevational, sectional view of the apparatus in FIG. 9 taken on plane X—X.
Figure 11:
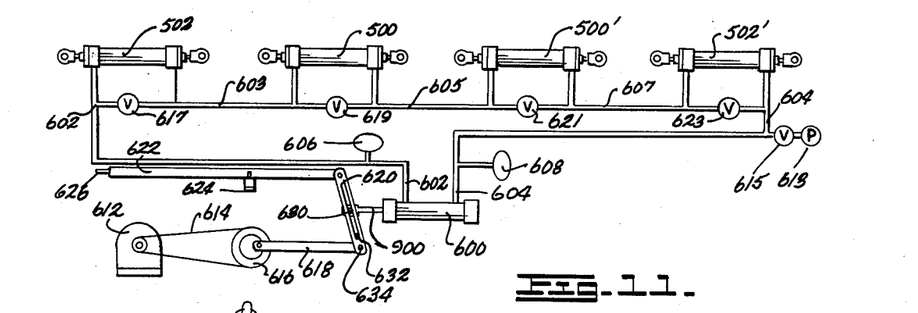
FIG. 11 is a schematic diagram of the hydraulic control circuitry and mechanism for the apparatus in FIGS. 9 and 10.

Referring to FIGS. 9, 10 and 11, a modification of some of the operative components illustrated in FIGS. 1 through 8 is shown. Basically, the device is essentially the same in principle. It employs the inverted U-shaped frame with drive wheels and hydraulic controls as before. However, instead of using a mechanical pitman-crank connection to oscillate the gripper means, and instead of using the elaborate mechanical plate and column assemblies slidable toward each other as in FIG. 3, these operative components are substituted by a simplified hydraulic structure. The bumper elements 110 and 112 are basically the same as those in the first form of the invention. Each is mounted on the inner ends of the rods of a pair of oscillatory fluid cylinders 500 and 502. The rear outer ends of these cylinders are rigidly affixed to an elongated bracket 504, the ends of which are affixed to the rods of a second pair of outer fluid cylinders 506 and 508. The rear ends of these outer fluid cylinders are affixed to a shaft 510 rotatably mounted in bearings 511 attached to frame 12. A cylinder (not shown) located overhead, rotates the cylindrical supports 510 through an arc, using a suitable connecting linkage 513 to raise and lower bumpers 110 and 112 and aprons 514 and 514', as well as the adjacent elements in these assemblies to provide optimum bush contacting height.

The apron structures 514 are each mounted to an independent pair of rods 526 from the independent fluid cylinders 516 and 518 astraddle the shaker cylinders. Each apron may be mounted on a suitable cord 520 which is attached to a tension spring 522 on each end of the apron inside a sheath 524 affixed to extended shafts 526 of the cylinders 516 and 518. In order to enable the aprons from the opposite sides, i.e. 514 and 514' to overlap each other, the sheaths 524 and 524' on the opposite sides are slightly spaced from each other as shown in FIG. 9.

Operation of the aprons is simply by a control valve to supply pressurized fluid to the front or rear of cylinders 516 and 518 to extend and retract the aprons. Since the aprons are flexible, they will wrap around the bush as they overlap, to prevent loss of berries. The berries roll from the aprons back into trough 540 where they roll to the center thereof to fall on a conveyor 542. The conveyor takes them to an elevated position behind the vehicle into a storage chamber.

To close the bumper elements 110 and 112 onto a bush to shake it, fluid cylinders 506 and 508 on both sides are actuated by pressurized fluid through a conventional control valve until the shakers contact the bush base with desired pressure. Then the device is ready to shake the bush to remove the berries therefrom.

Referring to FIG. 11, a schematic view of the operating and control means for the shaking apparatus is there shown. The four identical, double end, double acting fluid cylinders 500, 502, 500' and 502' are shown supplied from an identical master cylinder 600. Line 602 from the front of master cylinder 600 communicates with the rear of cylinder 502. The outlet line 603 from the front of cylinder 502 communicates with the rear of cylinder 500. The outlet line 605 from the front of cylinder 500 communicates with the front of cylinder 500' on the opposite side, while the line 607 from the rear of cylinder 500' communicates with the front of cylinder 502'. The outlet line 604 from the rear of cylinder 502' communicates with the rear of master cylinder 600. In brief, these slave cylinders are in series relationship with two on each side facing the opposite two. A suitable pump 613 is connected into the system to maintain operating pressure, controlled by valve 615. Each slave cylinder has a valved line connected between the opposite ends for regulation purposes. The valves 617, 619, 621, and 623 are normally closed, and are opened only to permit the movement of an individual piston back into place with the others in case it should lose synchronism by leakage or such. The valves would also be opened to permit easier charging of the system and to pre-pressure the system with the pump.

Master cylinder 600 is operated by a crank and pitman drive which includes a motor 612 which may be a fluid motor operated from the internal combustion engine 16, a chain or belt drive 614 to the sprocket or pulley 616 to operate the crank to the connecting rod 618, and to oscillate lever 620 back and forth. Lever 620 is mounted on its lower end to rod 618, and at its other upper end to a control rod 622. The control rod is pivotally mounted to a fixed support 624 in its center and has a handle 626 at the opposite end. As crank 616 rotates, it oscillates rod 618 and lever 620 back and forth to oscillate the piston in master cylinder 600. This applies pressure first through line 602 and then line 604 alternatively. Thus, the slave cylinders 500 and 502 first extend their shafts or piston rods, while the shafts of cylinders 500' and 502' are retracted, and then vice versa, to create a synchronous oscillatory action with a resulting shaking movement where both of the bumpers 110 and 112 move together from one side to the other while remaining in contact with the bush.

Intensity of shaking is controlled through the manual lever 622. By pivoting the lever upwardly or downwardly, the position of pin 630 in elongated slot 632 varies the distance of pin 630 from pivotal connection 634 between piston rod 900 and rod 618 to effectively vary the stroke of the rod and piston in cylinder 600. By varying this stroke, the strokes of the slave cylinders are likewise varied the same amount, so that the shaking can be accurately controlled.

In the operation of this form of the invention, the vehicle is maneuvered over the top of the plant and then stopped as described above. Then the four fluid cylinders 506, 508, 506' and 508' are actuated to grip the bush between the bumpers 110 and 112. Also, the four cylinders 516 and 518 are actuated to overlap the aprons and wrap them around the bush. Then the drive mechanism from motor 612, chain 614, crank 616, rod 618 and lever 634 to the master cylinder 600 is actuated to reciprocate the piston in the master cylinder, and thus alternately apply retracting and extending pressure to the slave cylinders 500, 502, 500' and 502' to shake the bushes. A suitable vibration interruptor or disruptor, such as the paddle wheels 250 or screen shells 800, is utilized to contact the bushes and the berries to cause the berries to be shaken vigorously.

It will be obvious to those having ordinary skill in this art, that various other structural modifications may be made in the inventive apparatus without departing from the principles of the apparatus taught. These obvious modifications are therefore deemed to be part of this invention, which is to be limited only by the appended claims and the reasonable equivalents thereto.

I claim:

1. The berry harvesting machine, comprising: oppositely positioned, bush straddling means to extend into contact with opposite sides of and grasp the base of a berry bush; oscillatory drive means operably associated with said bush straddling means to oscillate said bush straddling means and the bush in a high intensity oscillatory pattern; means to extend under the bush to catch the berries which fall; and oscillatory pattern disrupting means movable into contact with the berries and branches and operable simultaneously with said oscillatory drive means to disrupt the created oscillatory pattern, causing the berries to vigorously shake and fall from said bush.

2. The berry harvesting machine, comprising: means to grasp the base of a berry bush on opposite sides thereof, including oscillatory drive means to oscillate the bush at a high intensity; means to extend under the bush to catch the berries which fall; and vibrational pattern disrupting means movable into contact with the oscillated bush to contact the berries and branches to disrupt the oscillatory pattern causing the berries to vigorously shake and fall from said bush; said disrupting means comprising expandable and contractable peripheral shell elements capable of contracting into contact with the bush.

3. The berry harvesting machine, comprising: means to grasp the base of a berry bush on opposite sides thereof, including oscillatory drive means to oscillate the bush at a high intensity; means to extend under the bush to catch the berries which fall; and vibrational pattern disrupting means movable into contact with the oscillated bush to contact the berries and branches to disrupt the oscillatory pattern causing the berries to vigorously shake and fall from said bush; said disrupting means comprising driven, slowly revolving bush contacting elements to apply gentle contact interference to the berries.

4. A berry harvesting vehicle, comprising: a wheeled, frame adapted to straddle a row of berry bushes; said frame having engine means operably mounted thereon to movably drive said frame; power, oscillatory gripping means on said frame mounted and operable to contact the opposite sides of and oscillate the base of the bush; movable oscillatory pattern interference means mounted above said gripping means and positioned to contact the berries and branches of the bush to break up the oscillatory pattern, and apron means shiftably mounted and adapted to extend from opposite sides of and wrap around the stem of said bush beneath said interference means to catch falling berries.

5. A blueberry picking vehicle comprising: a wheeled frame of generally inverted U-shape with legs to straddle the blueberry bushes; an engine mounted on said frame; drive means from said engine to the wheels of said vehicle; bush grasping means comprising an element extending from the opposite legs into the space therebetween, and adjacent the base of the vehicle to grasp a bush in said space when extended toward each other, and to allow free vehicle movement over the bush when retracted towards said legs; flexible apron berry collection means adjacent said grasping means adapted to be shifted from a retracted position adjacent said legs to an extended position wrapped around the base of a straddled bush; means to oscillate said grasping means to shake the base of said bush and vibrate the berries therefrom; said oscillating means being operably linked to said engine through a drive means, with said drive means causing elements from the opposite legs to oscillate synchronously and in direction back and forth so that the bush may be kept in its gripped condition during the high speed oscillation.

6. A blueberry picking vehicle comprising: a wheeled frame with legs to straddle the blueberry bushes; an engine mounted on said frame; drive means from said engine to the wheels of said vehicle; bush grasping means comprising an element extending from the opposite legs in the space therebetween and adjacent the base of the vehicle to grasp a bush in said space when extended toward each other, and to allow free vehicle movement over the bush when retracted towards said legs; flexible, apron, berry-collection means adjacent said grasping means adapted to be shifted from a retracted position adjacent said legs to an extended position wrapped around the base of a straddled bush; means to oscillate said grasping means to shake the base of said bush and vibrate the berries therefrom; said oscillating means being operably linked to said engine through a drive means with said driven means causing elements from the opposite legs to oscillate synchronously and in direction back and forth so that the bush may be kept in a gripping relationship during the high speed oscillation; vibrational pattern disrupting means adapted to contact the berries and branches during shaking of the bush by said oscillation to cause the berries to fall; and means to guide bushes between said legs and said gripping means.

7. A blueberry picking vehicle comprising: a wheeled frame of generally inverted U-shape with legs to straddle the blueberry bushes; an engine mounted on said frame; drive means from said engine to the wheels of said vehicle; bush grasping means comprising elements extending from the opposite legs into the space therebetween, and adjacent the base of the vehicle to grasp a bush in said space when extended toward each other, and to allow free vehicle movement over the bush when retracted towards said legs; flexible, apron, berry-collection means adjacent said grasping means, adapted to be shifted from a retracted position adjacent said legs to an extended position wrapped around the base of a straddled bush; berry retention curtain means extending vertically adjacent said grasping means; means to oscillate said grasping means to shake the base of said bush and vibrate the berries therefrom; said oscillating means being operably linked to said engine through a drive means, with said driven means causing elements from the opposite legs to oscillate synchronously and in direction back and forth so that the bush may be kept in a gripping relationship during the high speed oscillation; variable control means for said oscillation means to control the intensity of vibration; rotating, vibration pattern disrupting paddle wheel means adapted to repeatedly contact the berries and branches during shaking of the bush by said oscillation to cause the berries to be vigorously shaken to fall; and belt guide means adjacent opposite sides of said space and driven in a direction opposite to vehicle movement to guide bushes between the legs and gripping means without frictional movement between the belts and bushes.

8. A blueberry harvesting vehicle, comprising: a generally inverted U-shaped frame with bush stradding legs and wheels at the lower ends of the legs; engine means mounted on said frame and operably associated with driving means on said wheels; a pair of gripping elements extending from the opposite legs toward each other across the space therebetween; said gripping elements being mounted on columns extending upwardly to the base of said inverted U; a pair of slidable mounting supports secured from which said columns depend, and adapted to move toward and away from each other across the cross member of said inverted U and thereby to move said columns and said gripping elements toward and away from each other across the space between said legs to enable the device to squeeze the base of the bush; motor means between said supports adapted to move them forcefully toward and away from each other; means to oscillate the gripping elements, with each of said gripping elements including a driven connection to said engine; said driven means to both of said gripping elements being interrelated in a manner to cause synchronous movement of both elements in the same direction back and forth to shake the bush base without releasing the gripping means therefrom; and extensible apron means adjacent said gripper elements and adapted to shift to close the space around the base of the bush and catch the berries falling therefrom when shaken by said gripper element.

9. A blueberry harvesting vehicle, comprising: a generally inverted U-shaped frame having wheels at the lower ends of the legs; engine means mounted on said frame and operably associated with driving means on said wheels; a pair of gripping elements extending from the opposite legs toward each other across the space therebetween; said gripping element being mounted on columns extending upwardly to the base of said inverted U; a pair of slide plate supports to which said columns are secured and depend; said plates adapted to move toward and away from each other across the cross member of said inverted U and thereby to move said columns and said gripping elements toward and away from each other across the space between said legs to enable the device to grasp the base of the bush; motor means between said supports adapted to move them forcefully toward and away from each other; a pitman-crank connection to each of said gripping elements including a drive connection to said engine, with said drive means to both of said gripping elements being interrelated in a manner to cause synchronous movement of both elements in the same direction back and forth to shake the bush base without releasing the gripping means therefrom; and extensible flexible apron means adjacent said gripper elements and adapted to shift and to wrap around the base of the bush and catch the berries falling therefrom when shaken by said gripper element.

10. A blueberry harvesting vehicle, comprising: a generally inverted U-shaped frame having wheels at the lower ends of the legs; engine means mounted on said frame and operably associated with driving means on said wheels;

a pair of gripping elements extending from the opposite legs toward each other across the space therebetween; said gripping element being mounted on columns extending upwardly to the base of said inverted U; a pair of slidable mounting supports secured to said columns and adapted to move toward and away from each other across the cross member of said inverted U and thereby to move said columns and said gripping elements toward and away from each other across the space between said legs to enable the device to grasp the base of the bush; motor means between said supports adapted to move them forcefully toward and away from each other; a pitman-crank connection to each of said gripping elements including a drive connection to said engine, with said drive means to both of said gripping elements being interrelated in a manner to cause synchronous movement of both elements in the same direction back and forth to shake the bush base without releasing the gripping means therefrom; extensible apron means adjacent said gripper elements and adapted to shift to close the space around the base of the bush and catch the berries falling therefrom when shaken by said gripper element; and moving, vibration-pattern disrupting means adapted to contact the berries and branches on both sides of the bush adjacent the respective legs of said frame to disrupt the vibrational pattern wherein the berries tend to form the nodes thereof, to cause extensive vibration of said berries for shaking them from said bush.

11. A berry harvesting machine, comprising: a frame having legs that are adapted to straddle a berry bush; wheels on said legs; engine means operably mounted on said frame and operably connected with driving means on said wheels; first fluid cylinder means with one end connected to the opposite legs and extending toward each other across the space therebetween; second fluid cylinder means operably connected to each of the extensible portions of the first fluid cylinder means; gripping elements mounted to the extensible portion of the second fluid cylinder means and facing each other across said space; a fluid pressure source to said first cylinder means to extend them toward each other and cause said grippers to contact and grip the base of a bush therebetween; said second cylinder means being operably connected to a reversible pulsating pressurized fluid source with the fluid cylinder means on one side of said machine being retracted with extension of the fluid cylinder means on the opposite side, and vice versa, to oscillate said gripping means and shake the bush to remove berries therefrom.

12. A berry harvesting machine, comprising: a generally U-shaped frame inverted so that the legs straddle a berry bush; wheels on said legs; engine means operably mounted on said frame and operably connected with driving means on said wheels; a first pair of fluid cylinders adjacent each leg with the outer ends connected to the frame and extending toward each other across the space between said legs; a mounting bracket extending between each pair on each side and connecting the piston rods thereof; a second pair of fluid cylinders operably connected to each of the brackets; a gripping element mounted to the extensible rods of each pair of second fluid cylinders, and facing each other across said space; a fluid pressure source to said first cylinders to extend them toward each other and cause said grippers to contact the base of a bush therebetween; said second cylinders being operably connected to a reversible pulsating pressurized fluid flow source, with the fluid cylinders on one side being retracted with extension of the fluid cylinders on the opposite side, and vice versa, to oscillate said gripping means and shake the bush to remove berries therefrom; and variable flow control means for said reversible flow source to vary the shaking intensity; and extensible apron means adapted to extend between the two legs around the base of the bush to catch the berries shaken therefrom.

13. A berry harvesting machine, comprising: a generally U-shaped frame inverted so that the legs can straddle a berry bush; wheels on said legs; engine means operably mounted on said frame and operably connected with driving means on said wheels; first fluid cylinder means with the outer ends connected to the opposite legs and extended toward each other across the space therebetween; second fluid cylinder means operably connected to the extensible portions of the first fluid cylinder means and extending toward each other; first gripping elements mounted to the extensible portion of the second fluid cylinder means and facing each other across said space; a fluid pressure source to said first cylinder means to extend them toward each other and cause said grippers to contact the base of a bush therebetween; said second cylinder means being operably connected to a reversible pulsating pressurized fluid flow source, with said second fluid cylinder means on one side being retracted with extension of said second fluid cylinder means on the opposite side, and vice versa, to oscillate said gripping means and shake the bush to remove berries therefrom; extensible apron means adapted to extend between the two legs around the base of the bush to catch the berries shaken therefrom; said second fluid cylinder means comprising slave cylinders and having fluid flow connections to a master cylinder; drive means to oscillate the piston and rod in said master cylinder to create said pulsating reversible flow; and means on said drive means to vary the stroke of said master cylinder and thus vary the pulsating effect of the slave cylinders and grippers.

14. A shaker-type harvesting machine, comprising: a frame; a pair of cooperative oppositely positioned shiftable gripping means to grip the opposite sides of a bush bearing fruit to be harvested; means extensible beneath the bush to catch fruit shaken therefrom; and means to oscillate each of said cooperative gripping means, comprising slave fluid cylinder means operably connected between said frame and each of said cooperative gripping means and having fluid connections, reversed with respect to each other, to a common master cylinder means, said master cylinder means being driven in a reciprocatory fashion to cause reciprocatory movement of both said slave cylinder means and gripping means in the same direction simultaneously to oscillate said bush; and vibration disrupting means mounted above said gripping means to gently contact the branches of said bush while shaken.

References Cited by the Examiner

UNITED STATES PATENTS

| | | | |
|---|---|---|---|
| 1,626,068 | 4/27 | Bartlett | 56—328 |
| 1,938,264 | 12/33 | Templeton | 56—1 |
| 2,660,021 | 11/53 | McDowell | 56—330 |
| 2,677,226 | 5/54 | Hyman | 56—29 |
| 2,834,172 | 5/58 | Wood | 56—19 |
| 2,929,184 | 3/60 | Lamouria | 56—1 |
| 2,993,323 | 7/61 | Tubbs | 56—330 |

T. GRAHAM CRAVER, *Primary Examiner.*

RUSSELL R. KINSEY, ANTONIO F. GUIDA,
*Examiners.*